Feb. 26, 1952  W. F. K. RIESTER  2,587,222
SEAL BETWEEN RELATIVELY ROTATABLE PART
Filed April 8, 1949
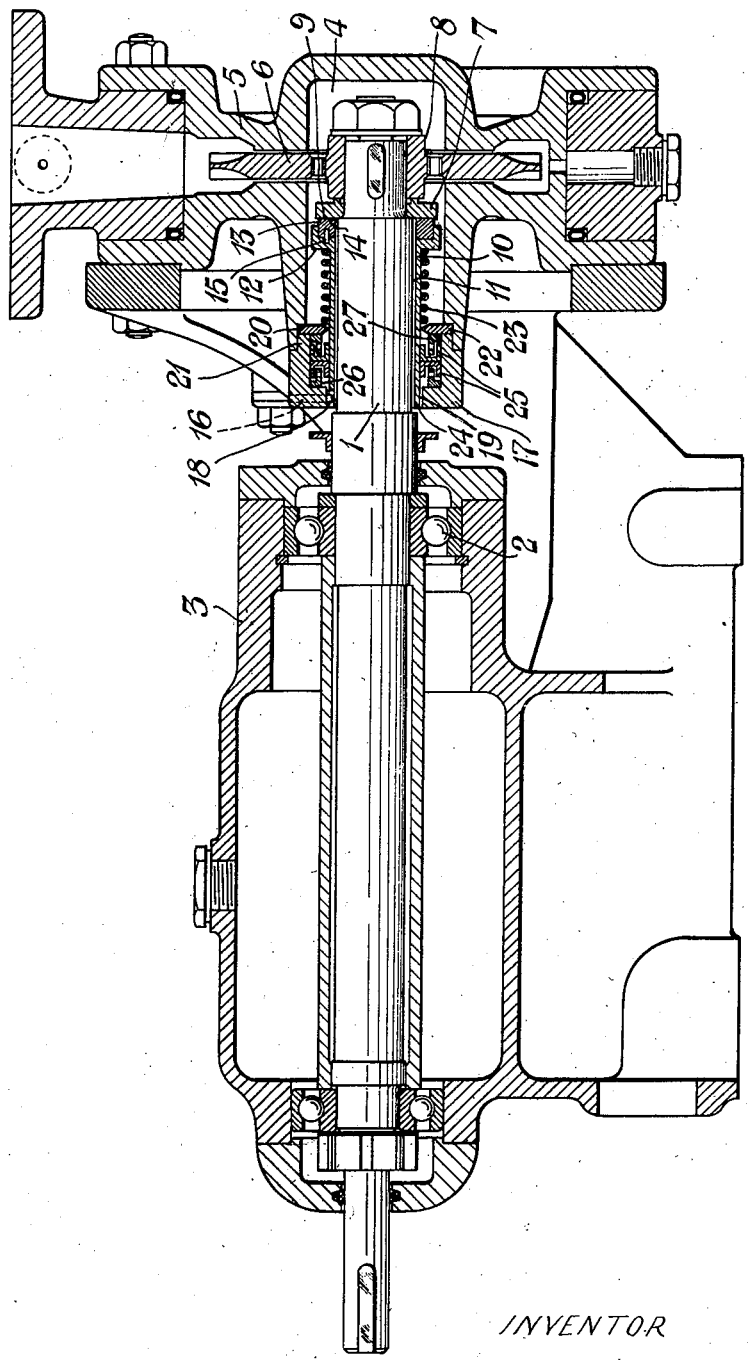
INVENTOR
WILHELM FREDERICK KARL RIESTER Patented Feb. 26, 1952

2,587,222

UNITED STATES PATENT OFFICE 2,587,222

SEAL BETWEEN RELATIVELY ROTATABLE PARTS

Wilhelm Frederick Karl Riester, London, England, assignor to Sigmund Pumps Limited, Gateshead, England, a company of Great Britain Application April 8, 1949, Serial No. 86,214
In Great Britain April 8, 1948

3 Claims. (Cl. 286—11.14)

The present invention relates to an improved arrangement for providing a seal between a shaft and a housing surrounding the shaft, the shaft and housing being arranged for relative rotation.

The object of the invention is to provide a seal which is effective to prevent flow or leakage of a fluid between the relatively moving parts even in cases where some degree of eccentricity, axial misalignment or conditions of vibration exist.

The sealing means according to the invention comprises a first annular sealing surface formed on the shaft or on a part surrounding and fixedly connected with said shaft, a sleeve surrounding the shaft with clearance and anchored against rotation relative to the housing, a second annular sealing surface on one end of the sleeve making rubbing contact with the first sealing surface on the shaft and one or more packing rings between the exterior of the body portion of the sleeve and the internal wall of the housing.

Means may be provided to bias the sleeve axially of the shaft in the direction to urge the annular sealing surfaces into contact with one another.

The sleeve may be surrounded intermediate its ends by a thin metal ring or apertured diaphragm supported in the housing, to permit limited rocking movements of the sleeve with respect to the axis of the shaft and maintenance of surface engagement between the two sealing surfaces under conditions of slight eccentricity, misalignment or vibration of the shaft.

An embodiment of the invention is illustrated in the accompanying drawing, showing in sectional side elevation the invention applied to a centrifugal pump.

Referring to the drawing, 1 is the driving shaft of a centrifugal pump, the shaft being carried in suitable bearings, one of which is shown at 2, in a suitable part of the casing 3, with the free end of the shaft extending into the central housing space 4 of the pump casing 5 and carrying the usual pump rotor 6.

In accordance with the invention a metal ring 7 is fixedly mounted on the shaft 1 adjacent the boss 8 of the pump rotor 6 within the housing 4, the face 9 of the ring 7 away from the boss 8 being machined flat and forming the first sealing surface. An elongated sleeve 10 surrounds the shaft 1 with a clearance 11, being of a length to extend from the ring 7 outside the entry to the housing 4.

The end of the sleeve 10 towards the ring 7 is provided with a radial flange 12 of a predetermined radial width and at the thus enlarged end of the sleeve 10 is fixedly mounted a ring 13 of wear-resistant material the end surface 14 of which forms the second sealing surface making rubbing contact with the first sealing surface 9.

The flanged end 12 of the sleeve 10 is preferably recessed to receive the wear-resistant ring 13, the latter being held against rotation in the recess by means of axially directed pegs 15.

The sleeve 10 is held against rotation relative to the housing 4 by means of pins or bolts 16 extending radially through the walls of a hollow end cap 17 surrounding the shaft 1 and the end of the sleeve 10 and fixed to the end of the housing 4, the said pins or bolts 16 engaging longitudinal notches or slots 18 formed in the outer end of the sleeve 10. A clearance 19 is provided between the end of the sleeve 10 and the central aperture in the hollow end cap 17.

The end of the housing 4 is counterbored as shown at 20 to receive the reduced inner end 21 of the hollow end cap 17 and between the bottom of the counterbore 20 and the hollow end cap is clamped a metal ring 22 surrounding the sleeve 10 and making little more than line contact on the periphery thereof. The ring 22 may be a thin flexible ring or may be a stiff ring with the inner peripheral portion thereof bevelled or tapered radially as shown. The dimensions are such that the thin ring 22 engages the sleeve 10 at approximately mid-way between its ends.

A spiral spring 23 extends between the thin metal ring 22 and the enlarged end 12 of the sleeve 10 to bias the sealing surface 14 towards the sealing surface 9.

In the space 24 between the sleeve 10 and the inner wall of the end cap 17, i. e. at the outer side of the thin ring 22, are mounted a pair of channel-section sealing washers 25 of flexible material such as leather, mounted with the channels back to back and held in position by spreader rings 26 and 27, one carried by the thin metal ring 21 and the other in the bottom wall of the end cap 17.

In the case of any slight misalignment, eccentricity or vibration of the shaft 1, the non-rotating sleeve 10, by virtue of the thin flexible metal ring 22, the flexibility of the channel-section rings 25, the clearance between the sleeve 10 and the shaft 1, the clearance between the sleeve 10 and the aperture in the end cap 17 and the pin and slot connection 16 and 18 between the end cap 17 and the end of the sleeve 10, is capable of rocking movements of small extent with reference to the axis of the housing 4 and sufficient to enable the sealing surface 14 to accommodate itself to any irregular movements of the sealing surface 9 of the ring 7.

The outer annular surface of the flange 12 away from the ring 13 at the end of the sleeve 10 is subject to the fluid pressure in the housing 4, and the inner diameter of the said outer annular surface, or in other words the outer diameter of the sleeve 10, being less than the outer diameter of the contacting sealing surfaces 9 and 14, this pressure gives rise to a pressure component on the sleeve 10 in the axial direction tending to maintain the sealing surfaces 9 and 14 in contact, thus aiding the spring 23 in preventing fluid pressure taking effect between those surfaces.

By suitable selection of the radial width of the said outer annular surface of the flange 12, an appropriate pressure engagement between the sealing surfaces 9 and 14 may be provided for. Furthermore the spring 23 may in some cases be omitted, the pressure component on the flange 12 being relied upon entirely.

The arrangement described including two flexible channel-section sealing washers 25, mounted back to back is effective to prevent leakage of fluid in either direction that is to say whether the pressure in the housing 4 is greater or less than that on the exterior.

As examples of materials suitable for use in forming the rubbing sealing surfaces may be mentioned carbon or oil bearing bronze, tungsten lead, or carbide silver.

Whilst the invention has been described and illustrated as applied to a centrifugal pump it is to be understood that it is applicable for use with any apparatus in which a shaft extends through the wall of a casing in which a pressure difference may exist between the inside and the outside of the casing.

I claim:

1. Means for providing a seal between a shaft and housing, comprising a first annular sealing surface on the shaft, a sleeve surrounding the shaft with clearance, means anchoring said sleeve against rotation relative to the housing, a second annular sealing surface on one end of the sleeve making rubbing contact with the first annular sealing surface on the shaft, a ring fixed within the housing and surrounding the sleeve and making substantially line contact with the surface thereof and at least one packing ring between the exterior of the body portion of the sleeve and the internal wall of the housing.

2. Means for providing a seal between a shaft and housing, comprising a first annular sealing surface on the shaft, a sleeve surrounding the shaft with clearance, an outwardly extending radial flange on one end of said sleeve, means anchoring said sleeve against rotation relative to the housing, a second annular sealing surface carried on the axially outer side of the radial flange on said sleeve and making rubbing contact with the first annular sealing surface on the shaft, a ring fixed within the housing and surrounding the sleeve and making substantially line contact with the surface thereof, a compression spring surrounding the sleeve and extending between the said ring and the face of the radial flange on the sleeve remote from the sealing surface carried thereby and at least one packing ring between the exterior of the body portion of the sleeve and the internal wall of the housing.

3. A device for providing a seal between a shaft and housing, comprising a first annular sealing surface on the shaft, a sleeve surrounding the shaft with clearance, an outwardly extending radial flange on one end of said sleeve, means anchoring said sleeve against rotation relative to the housing, a second annular sealing surface carried on the axially outer side of the radial flange on said sleeve, and making rubbing contact with said first annular sealing surface on the shaft, a ring fixed within the housing and surrounding said sleeve and making substantially line contact with the surface thereof, a compression spring surrounding said sleeve and extending between said ring and the face of said radial flange on the sleeve remote from the sealing surface carried thereby, and at least one packing ring between the interior wall of the housing and that part of the body portion of the sleeve at that side of the sleeve contacting ring which is remote from said radial flange on said sleeve.

WILHELM FREDERICK KARL RIESTER.

REFERENCES CITED

The following references are of record in the file of this patent:

UNITED STATES PATENTS

| Number | Name | Date |
| --- | --- | --- |
| 1,927,543 | Doyle | Sept. 19, 1933 |
| 2,023,898 | Olson | Dec. 10, 1935 |
| 2,037,144 | Olson | Apr. 14, 1936 |
| 2,108,760 | Weiher | Feb. 15, 1938 |
| 2,250,714 | Bour | July 29, 1941 |
| 2,479,236 | Hanson | Aug. 16, 1949 |